United States Patent
Fleming et al.

(10) Patent No.: US 8,052,034 B2
(45) Date of Patent: *Nov. 8, 2011

(54) LATERAL POSITION DETECTION AND CONTROL FOR FRICTION STIR SYSTEMS

(75) Inventors: Paul Fleming, Boulder, CO (US); David H. Lammlein, Houston, TX (US); George E. Cook, Brentwood, TN (US); Don Mitchell Wilkes, Nashville, TN (US); Alvin M. Strauss, Nashville, TN (US); David R. Delapp, Ashland City, TN (US); Daniel A. Hartman, Fairhope, AL (US)

(73) Assignee: Vanderbilt University, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/940,237

(22) Filed: Nov. 5, 2010

(65) Prior Publication Data

US 2011/0041982 A1 Feb. 24, 2011

Related U.S. Application Data

(60) Continuation-in-part of application No. 12/703,811, filed on Feb. 11, 2010, now Pat. No. 7,850,057, which is a division of application No. 12/130,622, filed on May 30, 2008, now abandoned.

(51) Int. Cl.
*B23K 20/12* (2006.01)
*B23K 31/12* (2006.01)

(52) U.S. Cl. ............... 228/112.1; 228/2.1; 228/103

(58) Field of Classification Search ............... 228/2.1, 228/112.1, 103
See application file for complete search history.

(56) References Cited

U.S. PATENT DOCUMENTS

2003/0085257 A1 * 5/2003 James et al. ............... 228/112.1

OTHER PUBLICATIONS

Hendricks et al., "Automatic seam-tracking of friction stir welded T-joints", International Journal of Advanced Manufacturing Technology, Mar. 2009, p. 490-495.*
Fleming, Paul. "Monitoring and Control in Friction Stir Welding", Dissertation—Vanderbuilt University, May 2009.*

* cited by examiner

*Primary Examiner* — Jessica L Ward
*Assistant Examiner* — Devang R Patel
(74) *Attorney, Agent, or Firm* — Novak Druce + Quigg LLP; Eduardo J. Quinones

(57) ABSTRACT

Friction stir methods are disclosed for processing at least one workpiece using a rotary tool with rotating member for contacting and processing the workpiece. The methods include oscillating the rotary tool laterally with respect to a selected propagation path for the rotating member with respect to the workpiece to define an oscillation path for the rotating member. The methods further include obtaining force signals or parameters related to the force experienced by the rotary tool at least while the rotating member is disposed at the extremes of the oscillation. The force signals or parameters associated with the extremes can then be analyzed to determine a lateral position of the selected path with respect to a target path and a lateral offset value can be determined based on the lateral position. The lateral distance between the selected path and the target path can be decreased based on the lateral offset value.

17 Claims, 10 Drawing Sheets

BLIND T-JOINT

MACHINE-FIXTURING BASED

COMPOSITION UNDER SHOULDER
PROXIMITY OF PROBE TO
SAMPLE/AIR OR SAMPLE/CLAMP
BOUNDARY

OTHER
COMPLEX
CURVATURES

MACHINE/FIXTURING

← INDENTATION/PROTRUSION

← UNEVEN HAIGHT

BACKING PLATE ORIENTATION

TOP CLAMP POSITION/CLAMPING FORCE

GAP INTRODUCTION

LATERAL POSITION DETECTION AND CONTROL FOR FRICTION STIR SYSTEMS

RELATED APPLICATIONS

This application is a continuation-in-part application of U.S. patent application Ser. No. 12/703,811, filed Feb. 11, 2010, which is a divisional of U.S. patent application Ser. No. 12/130,622, filed May 30, 2008, and all of the foregoing are incorporated herewith by reference in their entirety.

GOVERNMENT RIGHTS

The United States Government has certain rights in embodiments of the present invention pursuant to prime contract No. W-7405-ENG-36 with the United States Department of Energy.

FIELD OF THE INVENTION

The present invention relates to friction stir systems (FSS) including friction stir welding (FSW) and friction stir processing (FSP) systems, and related position detection methodologies for such systems.

BACKGROUND

One FSS embodiment is FSW. FSW is a joining process where welding is accomplished via mechanical stirring at a temperature that is below the melting point of the material being welded. In FSW, the welding tool comprises a shoulder and a pin (also called a probe). The tool is rotated while traversing the weld line. The shoulder applies pressure and friction induced heat to the surface of the material while the probe plunges into the material and induces material flow.

Another FSS embodiment is referred to as friction stir processing (FSP). FSP is a surface treatment technique which generally uses the same tool body as FSW, but lacks a FSW type probe. FSP is a relatively new surface-engineering technology that can locally eliminate or reduce casting defects and refine microstructures, thus improving strength and ductility, increasing resistance to corrosion and fatigue, enhancing formability, and improving other properties. FSP can also produce fine-grained microstructures through the thickness, imparted by superplasticity. Analogous to FSW, in FSP there is generally substantial and complex material flow.

FSW can be applied in a number of configurations, or positions, of the material to be welded and the FSW tool. One FSW configuration is referred to as butt-weld. In this arrangement the materials to be jointed are generally butted together side by side. The tool traverses the seam between the two samples, welding them together. The probe generally extends nearly to the base of the material. In this case, it is desirable for the probe to be well positioned with respect to the weld line.

Another FSW configuration is referred to as lap weld. In this case, the two samples are laid one on top of the other. The FSW probe extends through the top material and some distance into the second to accomplish the weld. Another FSW configuration is referred to as T-joint. In the T-joint, the materials to be welded are arranged in a T, with a horizontally-oriented sample set on top of a vertically-oriented sample. Other FSW configurations include the corner weld and edge weld.

As known in the art, welds from FSW can experience a loss in weld quality when the system parameters and conditions are not well set. For instance, in the case of FSW, loss of quality can occur if the welding tool rotates too slowly, or too quickly, or if the probe is not the correct length for the material (e.g. a probe in butt-welding extends only halfway through the material, leaving the lower half of the seam un-bonded).

One flaw-inducing condition for FSW and FSP systems can be due to lateral misalignment during the FSW or ESP process. Lateral misalignment results when the FSW or FSP tool is offset relative to the selected lateral position or selected path referenced to the workpiece(s). In FSW, lateral misalignment can cause poor quality welds. In FSP, lateral misalignment can cause unintended microstructural results.

In the case of FSW, examples of lateral misalignment for lap weld, T-weld and butt weld (left to right) are shown in FIG. 1 as A, B and C, respectively. In lap-welding, lateral misalignment can arise when the probe is located entirety within the material but the shoulder of the tool is not completely in contact with the upper material. This condition can result in a number of generally undesirable consequences that result from insufficient heat input due to less shoulder contact and thus less friction. Also material could be ejected out into the area under the exposed shoulder. In the T-joint (FIG. 1B), the probe is shown offset to the point where a portion of the probe does not reside in the lower material. In T-joints, the geometry of the material beneath the shoulder is changing with lateral offset, in that the tool is more or less centered over the vertical member. Additionally, the probe moves toward or away from the edges of the vertical member. These changing conditions will cause changes in weld quality. Lateral offset is known to cause deterioration of quality for T-joints in both the extended un-bonded region to the right of the probe as well as the loss of the material which is generally ejected to the left of the probe. Finally in the butt-joint (FIG. 1C), the probe is shown laterally offset relative to the joint line sufficiently so that the probe is only in one of the material pieces. In butt-joints, the composition of the material under the shoulder does not change, but the amount the probe that is in each material does. At centered locations, the probe is half in one material and half in another. In an offset position, it is largely in one piece, and only slightly in the other. The resulting weld quality for significant lateral offset in butt-joints will likely be quite low.

Visualization is one known technique for identifying and correcting lateral misalignment. In butt-joint and in some lap welding configurations the alignment of the FSW tool with regard to the weld seam can generally be visually observed. However, in other lap welds including blind T-joint, visualization is not generally possible. In blind T-joints this inability results because the lower vertical member cannot be seen through the upper horizontal member. Similarly, in certain FSP processes, visualization is not generally possible. There is thus a need for a new technique to better maintain FSW and FSP processing tools in a desired lateral alignment during system operation.

SUMMARY

Embodiments of the invention concern lateral position detection and control for FSS and FSW systems. In particular, friction stir methods for processing at least one workpiece is provided, where a system for the methods includes a spindle actuator coupled to a rotary tool including a rotating member for contacting and processing the at least one workpiece.

In a first embodiment of the invention, a method includes the step of oscillating the rotary tool laterally with respect to a selected propagation path for the rotating member with respect to the one workpiece to define an oscillation path for the rotating member. The method also includes the step of obtaining one or more force signals or parameters related to the force experienced by the rotary tool at least while the rotating member is disposed at first and second extremes of the oscillation of the rotary tool. The method further includes the step of comparing the force signals or parameters associated with the first extreme and the force signals or parameters associated with second extreme to stored correlation data to determine a lateral position of the selected path with respect to a target path for the at least one workpiece. The method additionally includes the step of determining a lateral offset value based on the lateral position and decreasing a lateral distance between the selected path and the target path based on the lateral offset value.

In a second embodiment of the invention, a method includes the step of oscillating the rotary tool literally with respect to a selected propagation path for the rotating member with respect to the one workpiece to define an oscillation path for the rotating member. The method also includes obtaining one or more force signals or parameters related to the force experienced by the rotary tool at least while the rotating member is disposed at first and second extremes of the oscillation of the rotary tool. The method additionally includes computing a difference between the force signals or parameters associated with the first extreme and the force signals or parameters associated with second extreme. The method further includes determining a lateral offset value to reduce the difference based at least on the difference and a stationary point type of a force-distance relationship associated a target path for on at least one workpiece. The method also includes laterally adjusting a position of the selected propagation path based on the lateral offset value.

In a third embodiment of the invention, a method includes oscillating the rotary tool laterally with respect to a selected propagation path for the rotating member with respect to the one workpiece to define an oscillation path for the rotating member. The method also includes obtaining one or more force signals or parameters related to the force experienced by the rotary tool at least while the rotating member is disposed at first and second extremes of the oscillation of the rotary tool. The method further includes selecting a first stationary point type of a force-distance relationship associated a target path for on at least one workpiece and computing a difference between the force signals or parameters associated with the first extreme and the force signals or parameters associated with second extreme. Additionally the method includes determining a lateral offset value to reduce the difference based at least on the difference and the selected stationary point type and laterally adjusting a position of the selected propagation path based on the lateral offset value. The method also includes repeating the obtaining and the computing steps and, if the difference is reduced, repeating the determining and the adjusting, else selecting a second stationary point type for the force-distance relationship different from the first stationary point type and repeating the determining and the adjusting.

In a fourth embodiment of the invention, a method includes the step of adjusting the rotary tool to cause the rotating member to move laterally with respect to a selected propagation path during processing of the at least one workpiece. The method also includes the steps of measuring a plurality of force signals or parameters related to the force experienced by the rotary tool at least white the rotating member is laterally moving away from the selected propagation path and reversing a direction of the lateral motion once an aggregate of the sampled force signals or parameters meets a reversal criteria.

DETAILED DESCRIPTION

Figure 1:
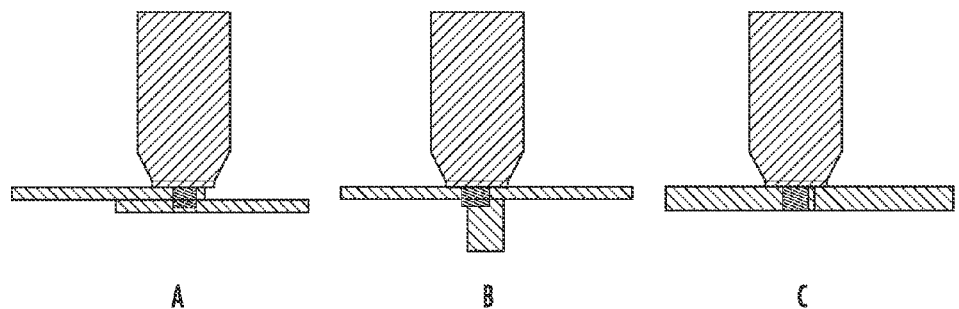
FIGS. 1A-C shows depictions of laterally misaligned friction stir welding (FSW) probes during a tap weld, T-weld and butt weld, respectively.

The present invention is described with reference to the attached figures, wherein like reference numerals are used throughout the figures to designate similar or equivalent elements. The figures are not draw to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The present Inventors have discovered that the lateral alignment for friction stir systems (FSS) comprising a rotary tool including a rotating member can be automatically detected, and optionally quantified and/or tracked by the inclusion of a lateral position detection system. The lateral position detection system measures one or more forces experienced by the rotary tool or a parameter related to the force (e.g. vibration via vibration sensing) experienced by the rotary tool during processing. The lateral alignment is generally based on the location of the rotating member relative to a selected lateral position or path referenced to a first and a second workpiece (e.g. a joint for FSW).

At least one sensor is operable to measure a force experienced by the rotary tool or a parameter related to the force experienced by the rotary tool during processing, wherein the sensor provides sensor signals. A signal processing system is coupled to receive and analyze the sensor signals. The signal processing system can automatically determine the lateral alignment of the rotating member relative to the selected lateral position or selected path, or in the case of the weaving methodology described below, a direction to decrease the lateral distance to the selected lateral position or selected path.

Although embodiments of the present invention are generally described relative to FSW, as will be clear to one having ordinary skill in the art, embodiments of the present invention can be applied to related FSP. As described above, other than the absence of a probe. The FSP system and method is otherwise generally identical to FSW and embodiments of the present invention can be applied in an analogous fashion to FSP. Although the deformation in FSP is generally confined to the workpiece surface, the process forces have been identified by the present Inventors to generally remain sufficiently high for detection thereof.

Automated lateral misalignment detection and optionally lateral alignment tracking systems according to embodiments of the invention can be configured for FSS including robotic based FSS. In a typical embodiment, the force is sensed directly by affixing a force sensor to the shaft of the FSS tool or below the anvil supporting the workpiece(s). In this embodiment, the force sensor can comprise a dynamometer, strain gauge, pressure sensor, load cell or other suitable sensor. Additionally, signals generated which can give information about the force(s) can generally be used, such as vibration signals. Accordingly, vibration sensors for sensing the vibration of the rotating member can also generally be used.

In a typical application, a FSS according to an embodiment of the invention acquires force signals which it uses to determine lateral offset. If the signal changes are symmetric about the desired position (e.g. seam) or path, then the system is generally only able to determine the lateral distance from the desired position, but not direction. In other cases, the signals obtained are non-symmetric and both the distance and the lateral direction can generally be obtained. In another application, an FSS according to an embodiment of the invention can be configured to compare the degree of lateral offsets of two locations (without knowing the absolute distance) and obtain the desired lateral position or path, or information to reduce the lateral distance to the desired position or path by weaving. Weaving generally comprises moving the rotating member in the lateral direction (thus orthogonal to the translation direction). Weaving is described in more detail below.

Sources of the force or parameter related to force to be sensed by the lateral position detection system can generally be classified as being workpiece-based or machine/fixturing based, or a combination of these. Workpiece-based as used herein refers to signals that arise from characteristics of the workpieces being friction stir processed. Machine/fixturing based as used herein refers to signals that arise from characteristics of the FSS itself, such as the clamping, spacers, or fixturing. Both the workpiece-based and machine/fixturing-based embodiments can also be configured to provide enhanced signals (extrinsic features added) as described below, or operated without any enhancement (intrinsic or non-enhanced). In the enhanced embodiment, the enhanced signal portion is generally due to features or changes in the workpiece and/or FSS inserted purposely to induce the enhanced signal portion. In the non-enhanced embodiment, there is no purposeful features or change in the workpiece and/or FSS introduced to provide an enhanced signal portion.

Figure 2A:
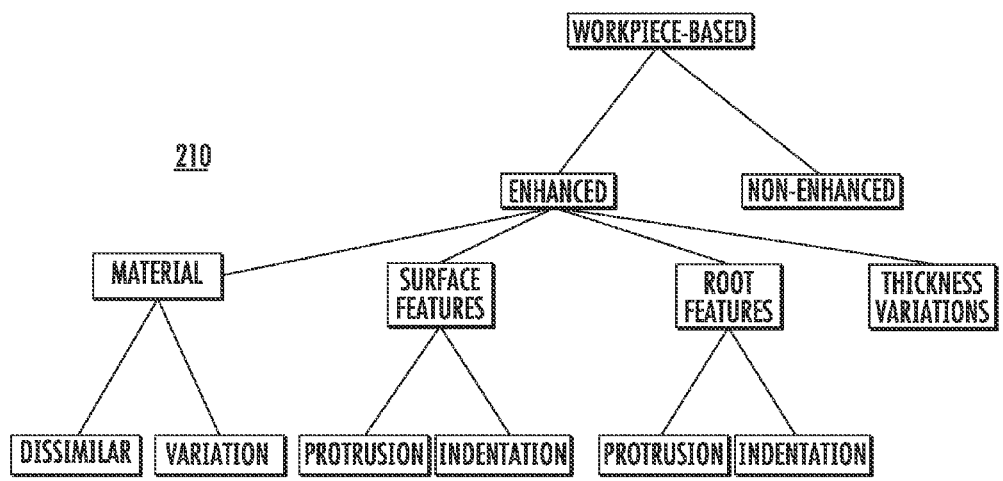
FIG. 2A shows a classification tree according to an embodiment of the invention for a friction stir system configuration having workpiece-based lateral position detection including an enhanced and a non-enhanced branch, and exemplary material, surface features, root features, and thickness variation for the enhanced branch.

FIG. 2A shows a classification tree 210 according to an embodiment of the invention for a FSS configuration having workpiece-based lateral position detection including an enhanced and a non-enhanced branch. The non-enhanced branch can be used, for example, in certain FSW configurations, such as lap welding where the two samples overlap only in a region (e.g. as shown in FIG. 1A), so that the composition of material under the shoulder generally changes with lateral position. Lateral offset will thus affect the material composition as the rotating member moves across the surface. The change in material composition results in a change in the force on the FSW tool that the Inventors have found can be related to the lateral position of the tool and a relationship established between these parameters.

However, in certain configurations, such as in the lap weld FSW configuration where two samples are overlapped completely (or other cases so that generally no offset position has the composition of the material under the shoulder change), then the forces will not generally change with lateral offset because nothing about the material being stirred or the fixturing is changing with offset. In such cases, an enhanced branch/configuration can be used.

Figure 2B:
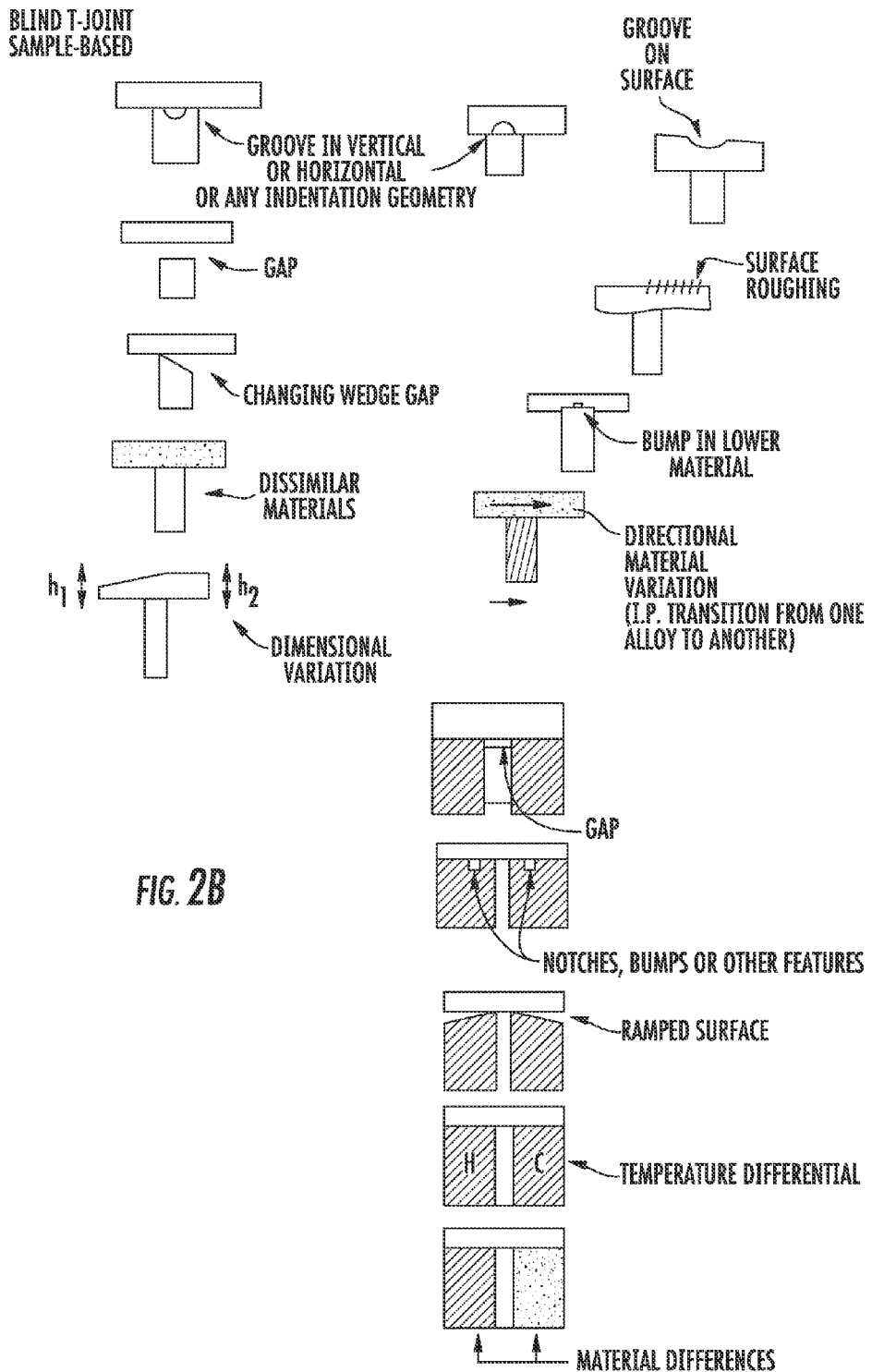
FIG. 2B shows specific exemplary workpiece-based enhancement species for a blind T-Joint FSW configuration.
Figure 2C:
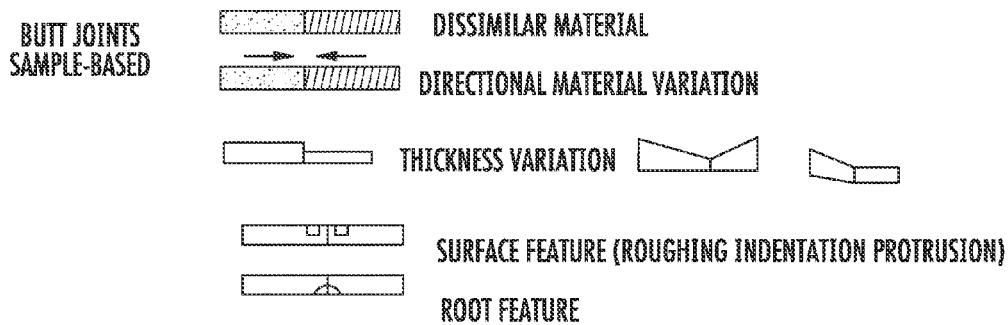
FIG. 2C shows specific exemplary workpiece-based enhancement species according to an embodiment of the invention for a butt-joint FSW configuration.

FIG. 2A also shows examples including material, surface features, root features, and thickness variation that can be used for workpiece-based signal enhancement. Some specie categories for the exemplary material, surface features, root features, and thickness variation are also shown in FIG. 2A. FIG. 2B shows some specific exemplary workpiece-based enhancement species for a blind T-Joint configuration. FIG. 2C shows specific exemplary sample-based enhancement species for a butt-joint configuration.

Figure 2D:
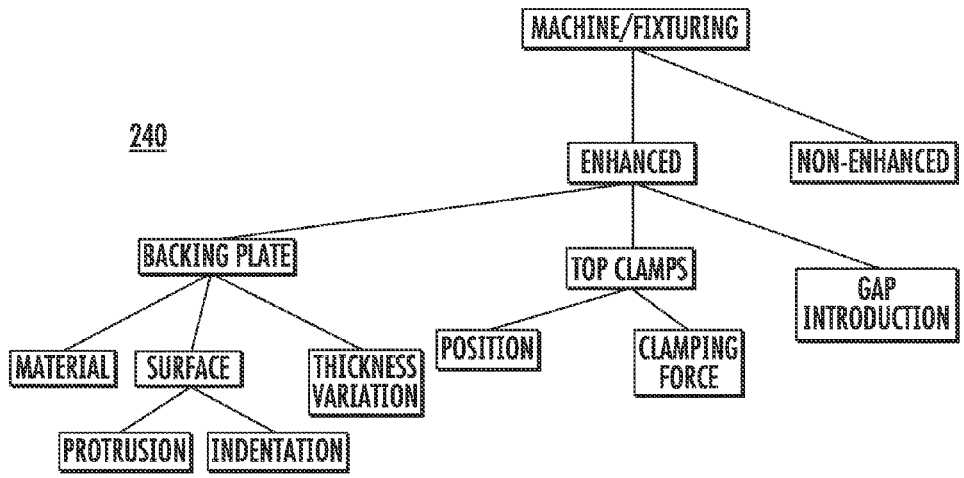
FIG. 2D shows a classification tree according to an embodiment of the invention for a friction stir system configuration having machine/fixturing-based lateral position detection including an enhanced and a non-enhanced branch, and exemplary backing plate, top clamps, and gap introduction and species thereof that can be used for the signal enhancement branch.
Figure 2D:
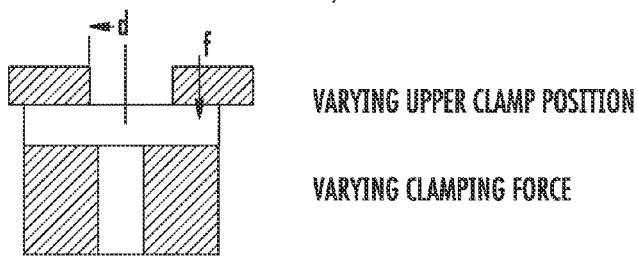

FIG. 2D shows a classification tree 240 according to an embodiment of the invention for a FSS configuration having machine/fixturing-based lateral position detection having an enhanced and a non-enhanced branch. The non-enhanced configuration can be used when useable signals are due to system characteristics not purposefully inserted to induce signals. In cases where the non-enhanced version does not provide a satisfactory signal level, a machine/fixturing branch/configuration can be used to provide an enhanced signal. FIG. 2D also shows exemplary backing plate, top clamps, and gap introduction that can be used for the machine/fixturing signal enhancement. Some species for the exemplary backing plate, top clamps, are shown in FIG. 2D.

Figure 2E:
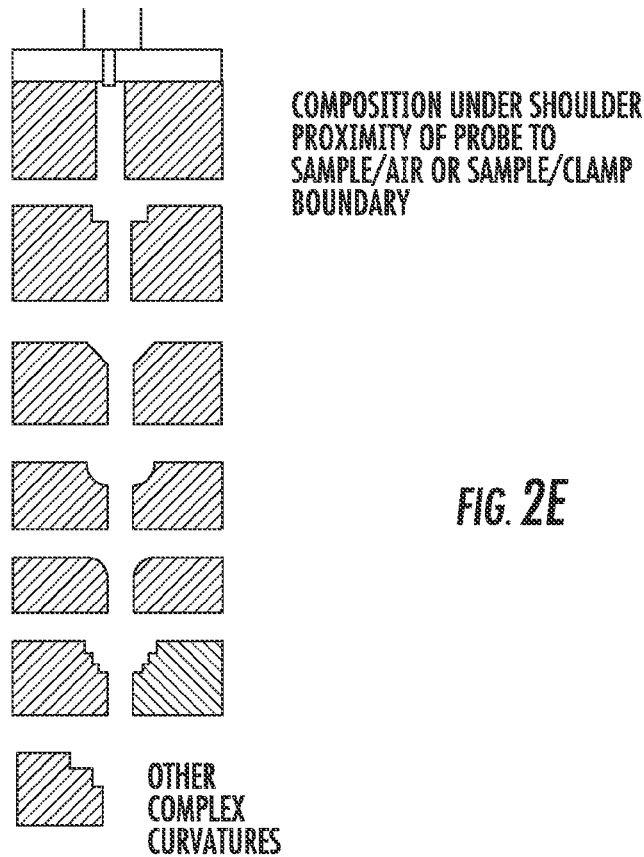
FIG. 2E shows specific exemplary machine/fixturing-based enhancement species according to an embodiment of the invention for a blind T-Joint FSW configuration.
Figure 2F:
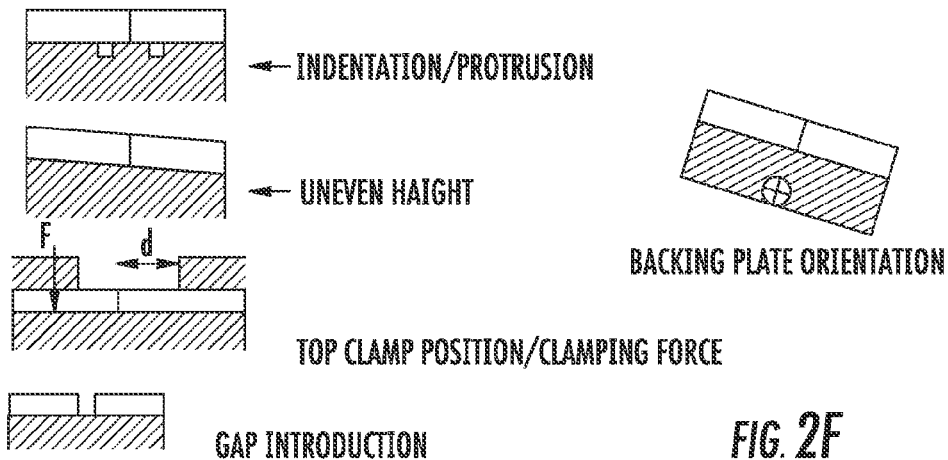
FIG. 2F shows specific exemplary machine/fixturing-based enhancement species according to an embodiment of the invention for a butt-joint FSW configuration.

FIG. 2E shows specific exemplary machine/fixturing-based enhancement species for a blind T-Joint configuration. FIG. 2F shows specific exemplary machine/fixturing-based enhancement species for a butt-joint configuration. It is noted that some of the exemplary enhancements shown in FIGS. 2A-2F can also be applied to lap welds and butt-joints, or FSP.

Figure 3A:
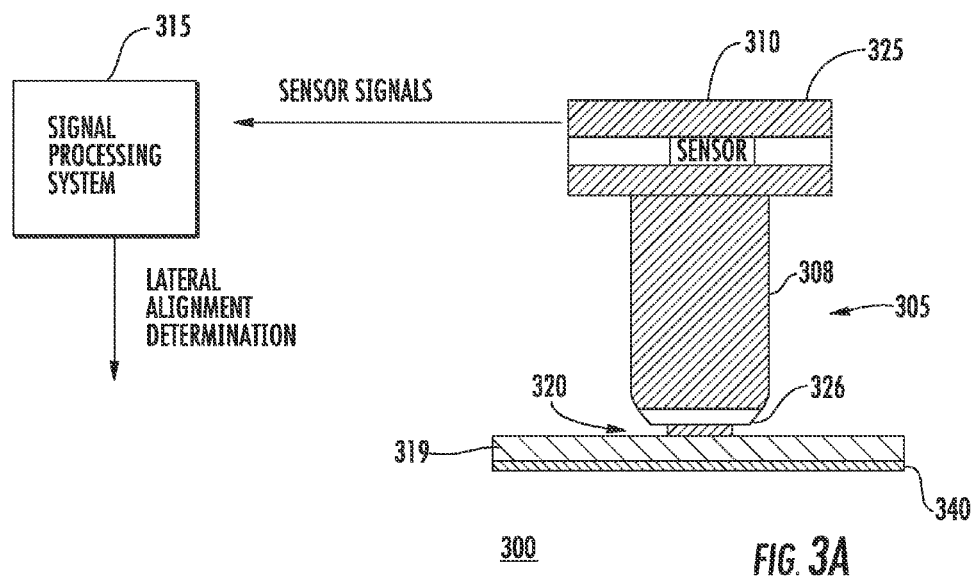
FIG. 3A is a simplified depiction of an exemplary FSS system having lateral position detection according to an embodiment of the invention for processing at least a first workpiece.

FIG. 3A is a simplified depiction of an exemplary FSS system 300 having lateral position detection according to an embodiment of the invention for processing at least a first workpiece 319. The workpiece 319 is shown disposed on supporting anvil 340. System 300 can be embodied for FSW or FSP. FSS tool 305 comprises a spindle actuator 308 having a tool chuck (not shown in FIG. 3A) fixed to a rotating shaft thereof for rotational driving rotary tool 320 comprising rotational member 326 including a shoulder for contacting and deforming the workpiece 319. Spindle actuator 308 is generally powered by a motor (e.g. electric) or by a hydraulic. A detection system 310 provides information relating to a lateral alignment of the rotating member 326 relative to a selected lateral position or selected path referenced to the workpiece 319. The detection system 310 comprises at least one sensor 325 operable to measure a force experienced by the rotational member 326 or a parameter related to the force it experiences during FSW or FSP processing, wherein the sensor 325 provides sensor signals. The sensor 325 shown in FIG. 3A can be a force sensor coupled to the tool 305. In this way, forces experienced by the tool 305 are transmitted through the tool to the force sensor 325.

Force sensor 310 can comprise a variety of different load cell configurations, which as known in the art are electronic transducers which convert a force into an electrical signal. This conversion is indirect and can comprise a mechanical arrangement for the force being sensed deforming a strain gauge, wherein the strain gauge converts the deformation (strain) to electrical signals. The electrical signal output is normally on the order of a few millivolts and is generally amplified before it can be used. The output of the transducer corresponds to the force applied to the transducer. Although strain gauge load cells are the most common, hydraulic (or hydrostatic), piezoelectric load cells, and vibrating wire load cells can also generally be used.

In one embodiment, the force sensor 310 comprises a dynamometer. A dynamometer can measure the axial force (Fz), in plane forces Fx and Fy, and the torque around in the axial direction (along the z-axis). For example, the dynamometer can comprise a dynamometer provided by Kistler Instrument Corp., Amherst, N.Y., which measures 4 forces: Fx, Fy, Fz and the Torque around the z-axis.

A signal processing system 315 is coupled to receive and analyze the sensor signals and determine the lateral alignment of the rotating member 326 relative to the selected lateral position or selected path, or a direction to decrease a lateral distance to the selected lateral position or said selected path. Signal processing system 315 can comprise a microprocessor having associated memory, the memory having stored correlation information, such as force vs. lateral offset correlation data. In one example, the correlation data shown in FIG. 5 or FIG. 6 described in the Examples below can be used.

Although connections for communications between components in FSS 300 are generally shown as wired (electrical) connections, optical and over-the-air connections may also generally be used with systems according to embodiments of the invention. In the case of over-the-air connections, receivers, transmitters or transceivers may be provided based on the need to receive information, transmit information, or both receive and transmit. For example, force sensor 310 can include an associated transmitter and antenna, and signal processing system 315 can include an antenna and a receiver operable to receive the sensed signal transmitted by the transmitter associated with the force sensor.

Figure 3B:
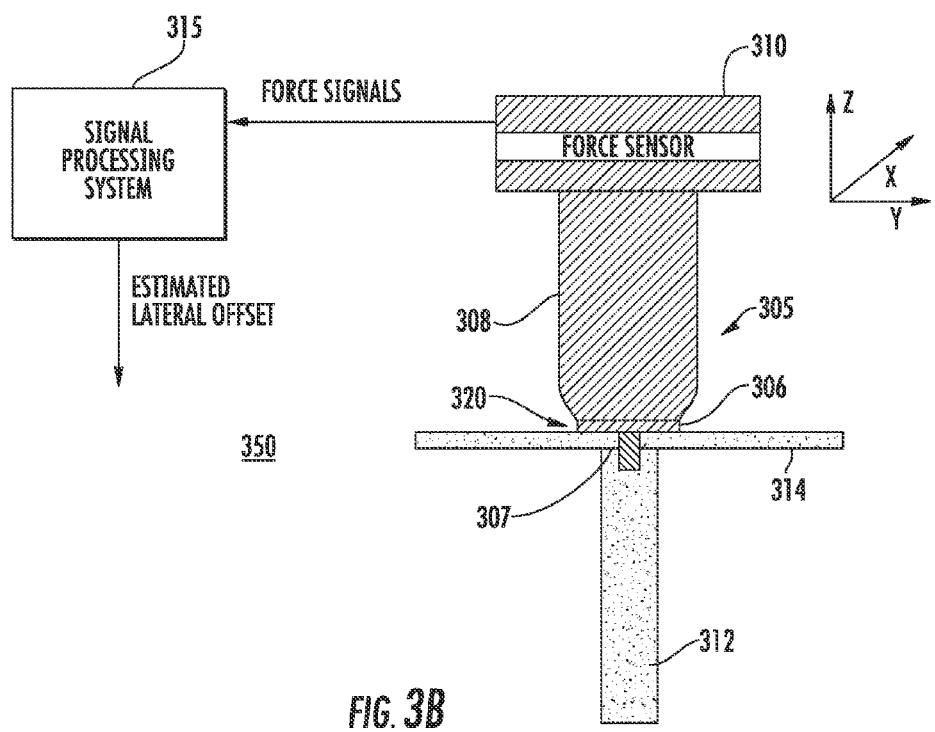
FIG. 3B is a simplified depiction of an exemplary FSW system having lateral position detection according to an embodiment of the invention.

FIG. 3B is a simplified depiction of an exemplary FSW system 350 having lateral position detection according to an embodiment of the invention. System 350 is operating on workpieces 311 and 312 arranged in a T-joint configuration. System 350 comprises FSW tool 305 comprising a spindle actuator 308 having a tool chuck (not shown in FIG. 3B) fixed to a rotating shaft thereof for rotational driving of a rotary tool 320 comprising shoulder 306 and probe 307. Probe has a length sufficient to extend into workpiece 312. A force sensor 310 is coupled to tool 305. A signal processing system 315 is coupled to receive force signals from force sensor 310. The force sensor 310 shown is affixed to the rotating shaft of tool 305, and it in turn holds the FSW tool 305. In this way, forces experienced by the FSW tool 305 are transmitted through the tool to the force sensor 310.

As described above, the force sensor 310 can be embodied as a variety of different load cells to measure one or more forces. The force signals experienced by rotary tool 320 transmitted through the FSW tool 305 that are sensed by force sensor 310 are transmitted to the signal processing system 315. As known in the art, the force signals can be filtered, amplified and converted to digital signals. Signal processing system 315 can comprise a microprocessor having associated memory, the memory having stored force vs. lateral offset correlation data, such as based on the data shown in FIGS. 5 and 6 described in the Examples below.

In one embodiment, experiments are performed in the laboratory to gather sufficient data to prepare a general correlation function that relates the measured force (or a force related parameter) experienced by the friction stir tool and the magnitude (and in some embodiments the direction) of lateral offset. One way of measuring the lateral offset to compile data for generating a correlation function is to use a string potentiometric transducer to directly measure the lateral offset of the stage. The string potentiometer uses a string pull to affect the resistance of a potentiometer, which in turn changes the voltage measured by and after signal processing (e.g. analog to digital (A/D) conversion) is translated into a position of the stage. Other methods for directly measuring lateral position include, but are not limited to, a magnetic tape reader, or a relative or absolute shaft encoder fixed to the shaft which moves the stage laterally. Linear position transducers are a general class of transducer which can perform this measurement. It may also be possible for simulations to be used instead of experiments to generate data to compile a correlation function, such as based on computational fluid dynamics to simulate the welds or surface deformation and the measured forces.

The signal processing system 315 having such data or a correlation function based on such data can determine the lateral offset from collected force signals. In one embodiment, the lateral offset can be reported as a real number which represents the lateral position. In the butt-joint configuration, this measurement is generally in terms of the distance of the location of probe 307 from the joint line center. The offset estimator can be based on a generally non-linear function which maps the input forces to an estimated lateral offset. Such a function could be derived from a data set through regression, or be implemented through a support vector machine, neural network or other suitable method. Alternatively, a function can also be derived from models or physical properties.

As noted above, force sensor 310 measures the magnitude of at least one force, such as the axial force experienced by the probe 307 associated with tool 305. In the case of T-joints, the force sensor is generally operable to detect a force in the range of about 1 kN up to 40 kN for the axial force. The other forces (in-plane and torque about the axial axis) during T-joint processing tend to be significantly lower in magnitude, generally being 100 N to 5 kN. The axial for magnitude alone for certain T-joint configurations has been found to generally be sufficient to estimate of the degree (magnitude) of lateral offset, but generally not the direction of lateral offset. In order to deduce the side (direction) of the weld an offset is on, in one embodiment force sensor 310 also measures at least one in-plane force, such as the in plane force along the x-axis shown in FIG. 3B. Alternatively, weaving according to an embodiment of the invention described below can be used to determine the direction.

As briefly described above, weaving comprises the back and forth lateral motion of the probe and monitoring the sensed force, parameter related to force (e.g. vibration) or signal derived therefrom such as the lateral offset signal to determine whether the tool is moving towards or away from a desired location. In weaving, it is generally assumed that the input data is approximately symmetric about the point desired to be maintained, as described below. In the case where the axial force is maximized at a particular location (alternatively, it could be minimized, or it could be some other force), then the weaving algorithm can move the probe in a weaving pattern, comparing locations relative to each other, and moving towards the location of maximal axial force. Weaving can thus be used to identify the direction to reach a desired lateral location.

For example, if the only signal available is the axial force, in the case of the T-joint, the relation generally provided would be an inverted parabola centered about the jointline when plotted against the magnitude of the lateral offset (See FIG. 5 described below which provides a relation between values of the axial forces (measured in Newtons) for T-joint welds run and the lateral offset (measured in inches). In this case, the FSW tool can be controlled to weave to maintain maximum axial forces. During the weave, using the sensed axial force, the tool can move toward the advancing side while the axial force is sensed to be increasing, and then reverse directions when the axial force is sensed to begin to decrease. As known in the art, the "retreating side" of a FSW weld joint refers to the transverse side of the weld joint where the tangential direction of the rotational motion of the pin is opposite the direction of the advancement of the pin through the structural members. The side opposite the retreating side, referred to as the "advancing side" is where the tangential direction of the rotational motion of the pin corresponds to the direction of the advancement of the pin. Since the forces on the advancing and the retreating sides will be slightly different, even when the workpiece is substantially symmetric about the propagation path, these different force characteristics can be used to enhancing tracking.

The output of the misalignment detection system, such as shown in system 300 or system 350, as described above, is generally a real number which represents the lateral position relative to the location of the rotating member, such as the probe's location relative to the joint line center in butt-welding. One additional piece of information that can be helpful in certain embodiments of the invention is which side of the center location (the FSS tool is offset. In certain experiments conducted, systems according to embodiments of the invention have been able to discern this. For example, in the case where there are asymmetric forces present (such as demonstrated for the x-force T-joints; see FIG. 6 described below), then a function, predictor or estimator can generally be configured to predict the location of the probe with respect to the desired location, including information about to which side the probe is offset.

However, in certain configurations, information regarding the side of the center location may prove difficult to determine. In such cases, weaving as described above can be used to determine which side of the center location the rotational tool is on. This is illustrated below with respect to FIG. 7.

Figure 7:
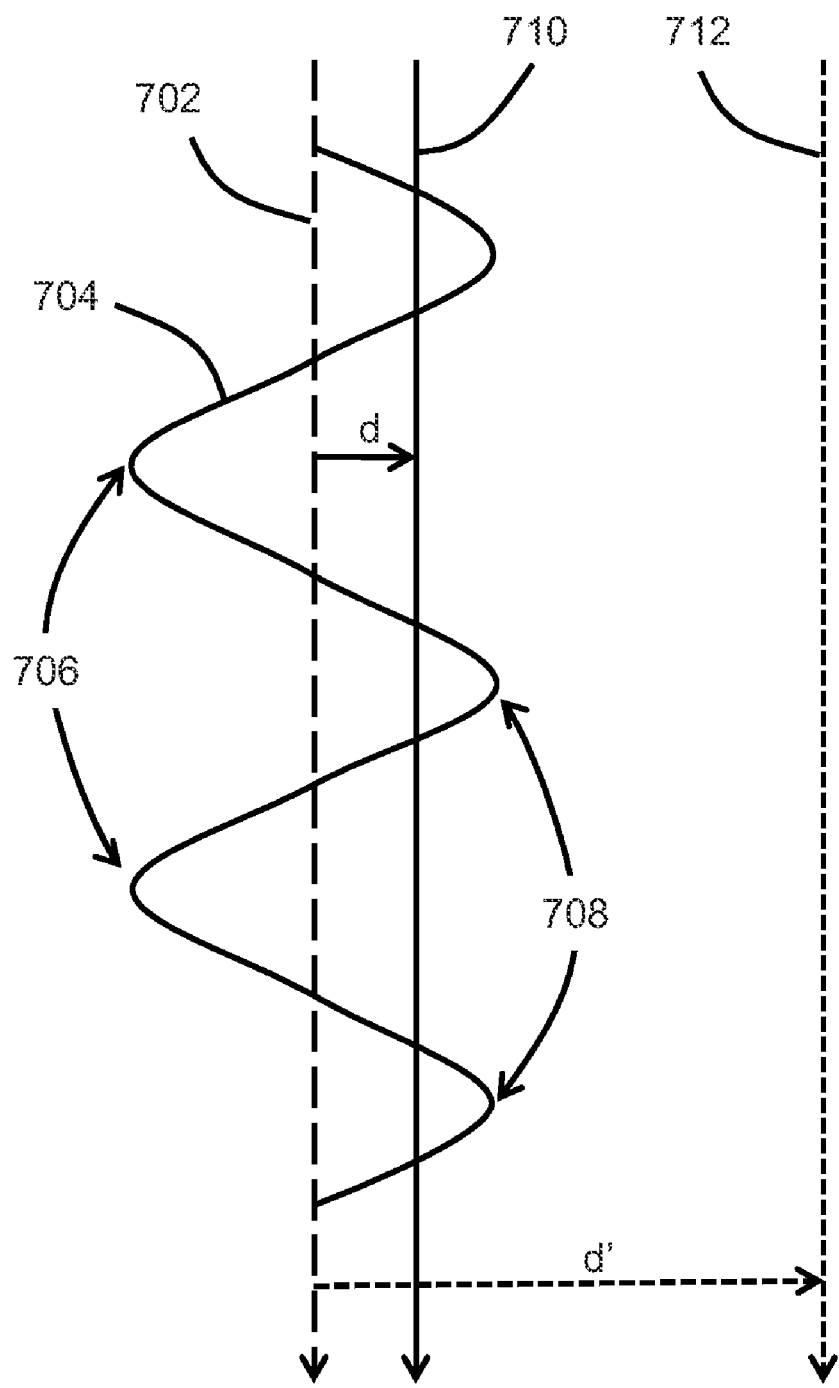
FIG. 7 is a schematic illustrating weaving of the rotary tool with respect to a selected propagation path and a target path within the weaving area, according to an embodiment of the invention.

FIG. 7 is a schematic diagram showing how weaving is useful for determining the center location (e.g., location of a joint). As shown in FIG. 7, the rotary tool (and the rotating member) would be configured to generally follow an initial propagation path 702 during processing of a workpiece, as previously described. However, the rotary tool would also be configured to follow path 702 using a weaving pattern 704. That is, the lateral position of the rotary tool would be adjusted as the rotary tool moves along the propagation path. This weaving can be used in several ways to adjust the propagation path of the rotary tool and the rotating member.

In some configurations, it is possible that the relationship between force and distance for the workpiece may be known or understood. That is, it is possible that data, such as that shown in FIGS. 5 and 6, may be available of the workpiece(s) to be processed. In such a configuration, the forces measured during the oscillation or weaving, such as the forces at the extremes 706 and 708 can be used to determine a location of the propagation path 702 with respect to the target path. In particular, the amplitude of the oscillation defining the weaving pattern 704 can be configured to be the same on both sides of the propagation path 702 (i.e., the lateral distance from 702 to 706 and the lateral distance from 702 to 708 are approximately the same). As a result, given a known force-distance relationship and the lateral distance between extremes 706 and 708, the forces measured at these extremes can be directly correlated to points in the force-distance data. Thus, a lateral distance or offset (d) or a lateral position of the target path 710 with respect to the propagation path 702 can be determined. Thereafter, an appropriate lateral offset value can be selected to reduce the lateral distance or offset (d) between the propagation path 702 and the target path 710. It is worth noting that in some instances, the lateral offset value can be selected so as to reduce the lateral offset (d) to zero. However, in other instances, a smaller lateral offset value can be selected. Thus, smaller adjustments can be performed in order for the propagation path 702 and the target path 710 to converge over time and to prevent accidental or substantial overshoot of the target path 710.

Figure 5:
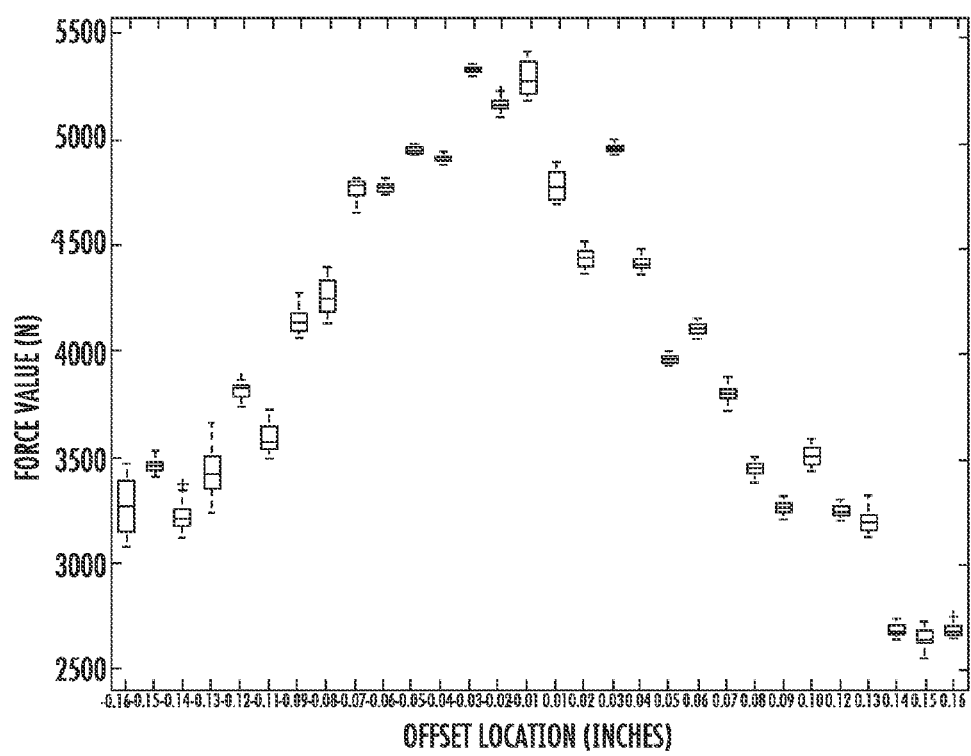
FIG. 5 shows values for the axial forces experienced by an FSW tool vs. varying amounts of lateral offset, according to an embodiment of the invention.
Figure 6:
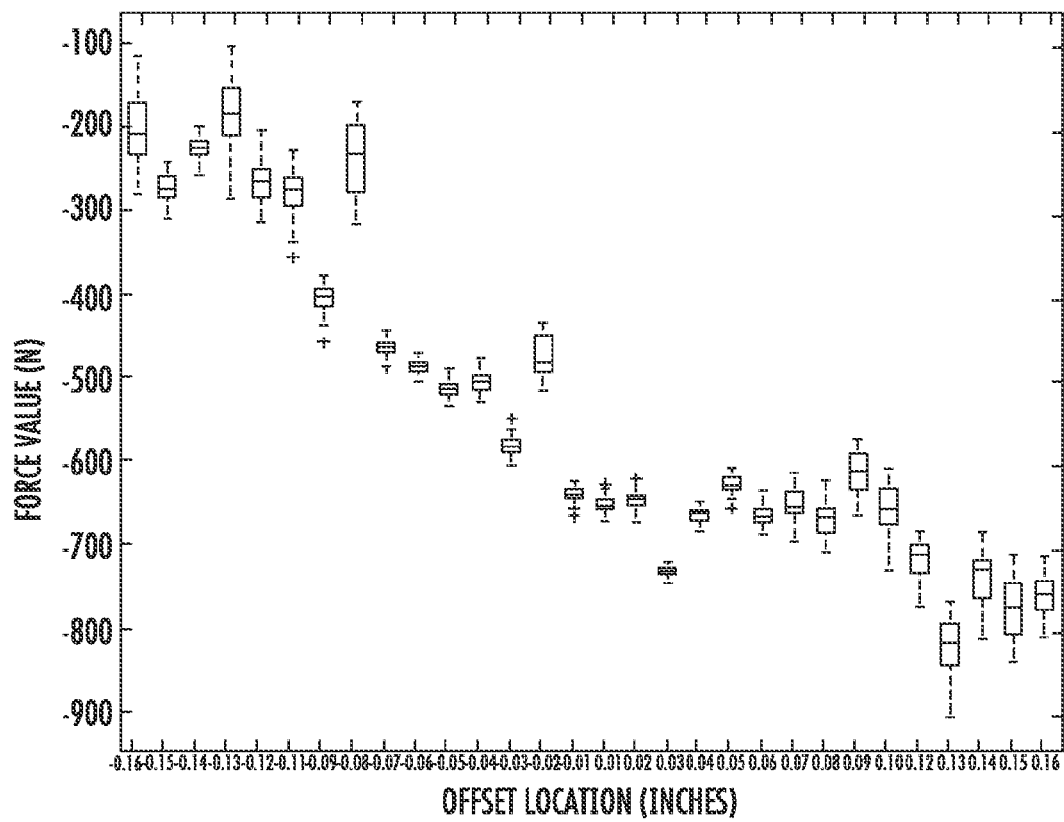
FIG. 6 shows the measured x-axis forces experienced by an FSW tool experienced during welding, according to an embodiment of the invention.

As noted above, there may be instances when data, such as that in FIGS. 5 and 6, is available for directly determining lateral offset values. However, in other configurations, such data may limited or may not be available.

For example, the data may be limited to the extent that all that is known is that the force-distance relationship results in the target path being associated with some stationary point in the relationship, such as a maximum point, a minimum point, or an inflection point. In such a scenario, weaving is still useful for guiding processing of the workpiece. In such a configuration, the extreme points of the oscillation, 706 and 708, can be compared to estimate a lateral offset required to reduce the lateral offset between the target path 710 and the propagation path 702. In particular, if the type of stationary point in the force-distance relationship is known, the propagation path 702 can be laterally adjusted to reduce a difference between the forces at the extreme points 706 and 708. As a result, as the points 706 and 708 are centered about the stationary point, the propagation path 702 also ends up at or nearer to the target path 710. This adjustment can be performed as follows.

First, as previously described, the rotary tool is configured to move the rotating member in a direction of the propagation path 702 and in lateral directions to define weaving path 704. Thereafter, the difference between the force measurements at extreme points 706 and 708 can be obtained. As described above, although the force-distance data may not be available, the configuration of the workpiece(s) can be used to define or specify the type of stationary point. For example, a T-joint weld has been found to be associated with a parabolic relationship with a maximum, as shown in FIG. 5. However, other configurations may be known to result in a minimum or an inflection point, as in FIG. 6.

The difference between the force measurements at points 706 and 708 will provide a value with a magnitude and a sign. In the case of a maximum (as in FIG. 5) or a minimum, the sign can be used to determine a lateral direction in which the propagation path should be offset. For example, if points 706 and 708 provide 4000N and 4500N, respectively, the difference between points 706 and 708 is −500N. The sign of this value can be used to directly indicate that propagation path 702 would need to be shifted in a direction from point 706 to point 708. Such a motion or shift would presumably result in an increase of the force measurement at point 706 and a decrease of the force measurement at point 708 during subsequent processing. If points 708 and 706 provide 4000N and 4500N, respectively, the difference between points 706 and 708 is +500N. This would indicate that propagation path 702 would need to be shifted in a direction from point 708 to point 706. Such a motion or shift would presumably result in an increase of the force measurement at point 706 and a decrease of the force measurement at point 708 during subsequent process. Thus, based on the sign, the direction for the lateral offset of the propagation path can be determined and a lateral offset value can be selected that moves the propagation path in this direction.

In the case of an inflection point, as in FIG. 6, the force-distance relationship near the inflection point will be monotonic. Thus, regardless of the position of points 706 and 708 relative to the target path 710, the sign will remain the same. In such configurations, the direction for the lateral offset or shift can instead be based on the magnitude of the difference between points 706 and 708. That is, if the magnitude of the difference increases, this means that the measurements at one or both of points 706 and 708 are significantly changing. This in turn indicates that propagation path 702 is not coincident with the target path 710. In contrast, if the magnitude of the difference decreases, this means that the measurements at the points 706 and 708 changing less, indicating that convergence and that the propagation path 702 is closer to the inflection point and thus the target path 710. Accordingly, in the case of an inflection point, a direction of the lateral offset can be reversed whenever the difference increases. Thereafter the lateral offset values are selected so as to cause the difference between measurements to decrease over time and converge.

In some configurations, the amount of lateral offset can be fixed. However, in other configurations, the amount can vary. For example, a magnitude of the difference between measurements can be used to determine lateral offset values. For example, assuming again force-distance relationship with a minimum or maximum point, as the difference between points 706 and 708 decreases, this would indicate that propagation path is near to or approaching the target path. In contrast, as the difference between points 706 and 708 increases, this presumably points to the propagation path being or getting farther from the target path. Thus, in the case where the difference is large, a larger lateral offset value can be provided, while a smaller lateral offset value can be provided when the difference is smaller. Thus, additional intermediate adjustments can be eliminated when the target path and the propagation path are far apart. Thereafter, small incremental adjustment can be provided to prevent accidental or significant overshoot of the target path.

As described above, the characteristics of the force-distance relationship may be completely unknown for the configuration of the workpiece(s) to be processed. However, in many cases using FSW processing, a force-distance relationship will typically include some type of stationary point associated with the center location. Therefore, if the initial propagation path is sufficient close to the target path, it is possible to provide processing without needing to provide any information regarding the configuration of the workpiece(s).

For example, in some configurations, the processing can be configured to determine the type of stationary point on-the-fly and thereafter adjust processing accordingly. That is, the difference between the measurements at points 706 and 708 can be determined, as described above. Thereafter, a first type of stationary point can be selected by the user or automatically by the control system of the FSW system. Based on the selected stationary point type, a lateral offset value can be determined as described above. However, if a subsequent calculation of the difference between the measurements at points 706 and 708 indicates that the difference is increasing, it can indicate that the incorrect stationary point type has been selected. Accordingly, a different stationary point type can be selected before proceeding.

Although the different stationary point type can be selected randomly or according to some predefined order, in some embodiments, this stationary point type can be selected based on prior force measurements and differences. That is, as processing is performed, force data is collected that correlates to a position on the workpiece(s), thus providing force-distance data. This data can then be used to determine the type of stationary point associated with center location. For example, although a maximum stationary point is initially selected, the data collected may indicate that the force-distance relationship is based on a parabola with a minimum or a monotonic function having an inflection point. Thus, either triggered by this analysis or a failure to converge, the controller can thereafter select a stationary point type based on the collected data. Additionally, based on additional collected data, additional corrections can be performed as processing continues.

Although the example above has been described with respect to the target path 710 falling within the area defined by the extreme points 706 and 708, the invention is not limited in this regard. Rather, the methods described above are equally suitable when the target path fall outside the area defined by extreme points 706 and 708, such as target path 712 separated from propagation path by an amount d'. That is, since the correlation data is available, the same methodology described above applies regardless of the position of target path 712. However, it is worth noting that if d' is sufficiently large, it is possible that the difference between the measurements at points 706 and 708 may not be significant and it may be difficult to determine the amount of lateral offset required.

During the weaving methods described above, force control techniques can be used to adjust the vertical position of the rotating member. Normally, if force control is used throughout the weaving, the difference in forces will be difficult to obtain, as the rotary tool is configured to maintain a constant force at all times. Thus, embodiments of the invention can instead implement force control as follows. In particular, force control can be toggled on and off according to the location of the rotary tool or rotating member along the weaving path 704. Specifically, when the location of the rotary tool or rotating member along the weaving path 704 substantially coincides with the propagation path 702, force control can be toggled on. For example, force control can be toggled on if the weaving path and the propagation path are within distance that is less than 10% of the weaving or oscillation width. Once the rotary tool or rotating member begins to move away from the propagation path 702, force control can be toggled off and the vertical position can be held until the weaving path and the propagation path again coincide. Such a configuration allows any necessary force control adjustments to be performed during processing, while allowing measurement of the force experienced by the rotary tool.

In some configurations, the rotary tool can be configured to have a center dwell time to allow sufficient time for force control adjustments to be made. That is, once the rotary tool positions the rotating member on the propagation path lateral motion can be temporarily hatted. The force control adjustments can then be performed. Thereafter, the vertical position of the rotating member can be locked and lateral motion can restart. In some cases, the amount of center dwell time can be fixed. However, in other cases, the amount of center dwell time can vary. For example, once force control is activated, it can remain on until the amount of adjustment occurring converges or meets some criteria.

In some configurations, the force control can also be toggled on periodically. That is, rather than turning force control on each time the rotating member crosses the propagation path, force control can be toggled on every $n^{th}$ time the propagation path is crossed. For example, every other time or every third time. However, the invention is not limited in this regard and n can be any positive integer.

FIG. 7, the weaving pattern 704 is shown as a sinusoid wave pattern. However, the various embodiments of the invention are not limited in this regard. Rather, in some embodiments of the invention, different weaving patterns can be provided by adjusting the lateral motion of the rotary tool. For example, in some embodiments, an extreme dwell time can be provided. That is, rather that immediately reversing direction upon reaching either of extremes 706 or 708, the rotary tool can hold the rotating member at either of extremes 706 and 708 for a period of time. This can be provided for purposes of improving processing of the workpiece(s). Additionally, this can also be provided to adjust the number measurement samples obtained at the extremes. This is, a collection of measurements can be taken at extremes 706 and 708. Thereafter, any lateral offset values can be calculated based on a mean or average of these measurements in order to improve accuracy.

In addition to the dwell time, the function defining how to transition between the extremes can also be adjusted as needed. Such a function can be configured to provide different amplitudes for weaving patterns or different transition times between extremes. Further such a function can also be configured to dictate how the transition from one extreme to another occurs. That is, a function can be provided that causes the transition between extremes to be linear or non-linear. For example, the function can be algebraic, trigonometric, exponential, logarithmic, or any combination thereof, to name a few. The present Inventors have shown that weave patterns improve joint properties in various cases, as compared to a straight path. Joint strength can be enhanced by weaving due to an increased volume of processed material, a widening of the stirred zone, and an enhanced fragmentation and mixing of the oxide layer. The shape of the weave pattern, including the extent and location of dwell periods, can be adjusted to improve joint properties such as tensile strength, fatigue strength, shear strength, and hardness.

In the various embodiments described above, it is assumed that the weaving pattern is symmetric with respect to the propagation path. However, the invention is not limited in this regard and asymmetric weaving patterns can also be used to provide processing without the need to compute lateral offset values in the case of workpiece configurations associated with some minimum or maximum point. In such configurations, it is generally desirable that the weaving provide approximately the same amount of processing on either side of the target path. Thus, in the case of a maximum or minimum, this characteristic of the workpiece(s) can be exploited and used to control the amplitude of weaving on either side of the propagation path.

In particular, the amount of weaving on each side of the propagation path can be based on an aggregate of the force measurements on each side and a threshold value. For example, in some embodiments, the rotary tool can be configured to begin moving the rotating member away from the propagation path. At the same time, the force signals can be sampled, aggregated, and compared to a threshold value. Thereafter, once the aggregate meets the threshold value direction is reversed. The process can then begin again after the rotating member crosses the propagation path.

Figure 8:
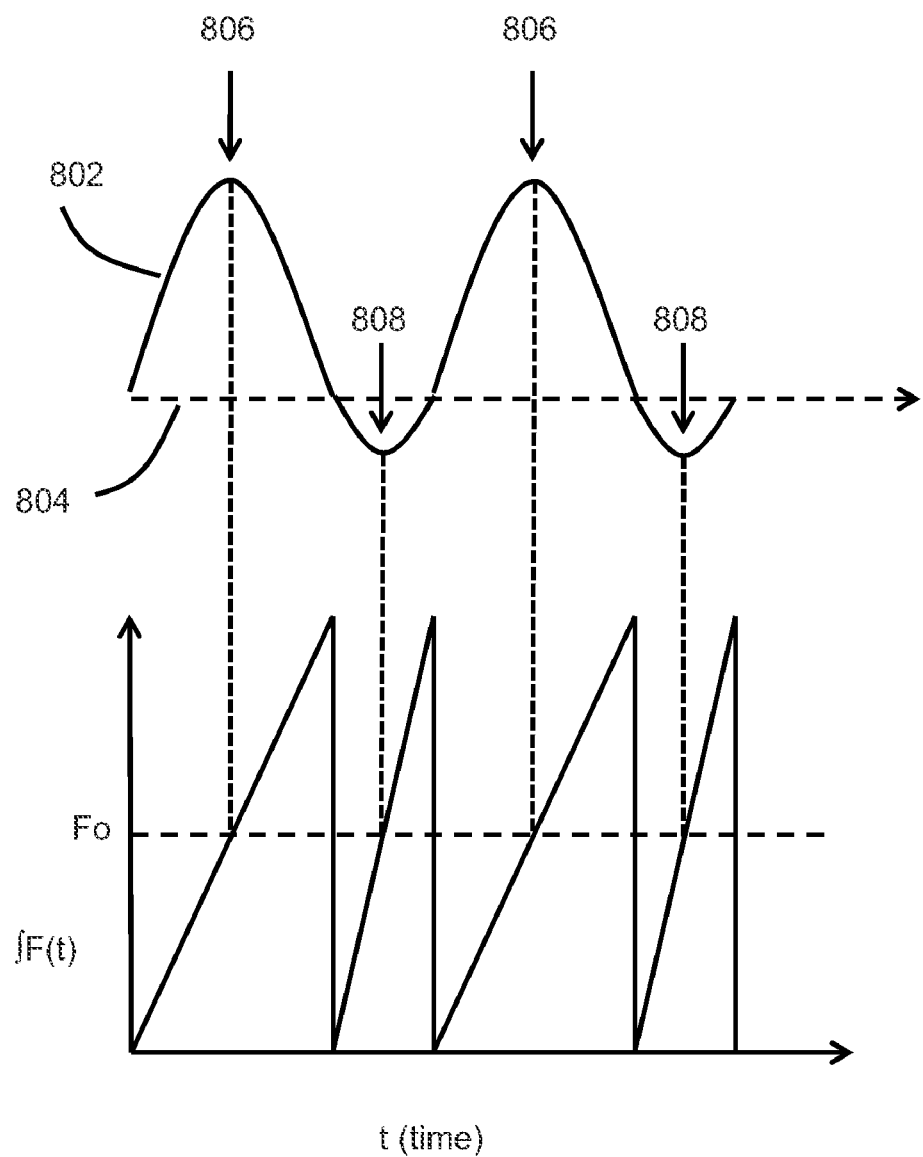
FIG. 8 is a schematic illustrating one embodiment for providing an asymmetrical weaving pattern, according to an embodiment of the invention.

The aggregate can be computed in a variety of ways. For example, in one embodiment, a sum or an integral of the force measurement samples, can be used to determine when the weave direction should be reversed, as shown in FIG. 8. FIG. 8 shows a schematic illustration for achieving an asymmetric weaving pattern in accordance with an embodiment of the invention. FIG. 8 shows a schematic illustration of a weave path 802 and corresponding X-Y plot of the integral of force as a function of time after crossing the propagation path 804. As shown in FIG. 8, the integral or sum of forces over time can be continuously computed after the weaving path 802 crosses the propagation path 804. Any known methods for computing the sum or integral of a collection of data points can be used without limitation.

Thus in a first portion of the weaving path, the forces are accumulated until the force integral meets a criteria or threshold (Fo). At that point, the extreme point 806 is defined and the lateral direction is reversed. In the next portion of the weaving path 802 after crossing the propagation path 804, the process is repeated to define extreme point 808 and the lateral direction is reversed. Although FIG. 8 shows the weaving path 802 as periodic, the invention is not limited in this regard. Rather, the actual shape of the weaving path 802 will be based on the actual forces encountered and the transition function used to transition from extreme 806 to extreme 808.

The advantage of the weaving process described above with respect to FIG. 8 is that it allows the weaving pattern to have a width that is self-adjusting based on pre-defined criteria. Such a process can be used to provide more targeted weaving for purposes of increasing weld strength. For example, in the case of a lap weld, as in FIG. 1A, improved weld strength is provided if the weave width extends essentially over the overlapping portions of the workpieces, but no further. In the case of perfect cuts (i.e., parallel cuts) on the edges of the overlapped sections, a weave patter can be selected that allows such a weave width. However, in the case of imperfect cuts, variations in the cuts, or improper selection of weave width, the resulting weave pattern will not result in the strongest possible weld. Rather, the resulting weave pattern will cover non-overlapping portions or, even worse, miss overlapping portions altogether. In contrast, when the weaving pattern is self-adjusting, via a sum, integral, or other aggregate measure, the width automatically conforms to the irregularities in the overlapping workpieces. As a result, the weaving pattern can be configured to automatically limit itself to the overlap portions, substantially limiting the amounts of non-overlapping portions being processed.

Although the embodiment illustrated in FIG. 8 is based on an integral or sum of forces, the invention is not limited in this regard. Rather, the sum or integral can be based on any other function dependent on the measured forces. For example, in some configurations the measured forces can be normalized with respect to a force value, such as the value at a maximum or minimum of a force-distance relationship. Such normalization can include processing the data value using a function to provide an adjustment of the data value with respect to a selected value. Such normalization functions can include obtaining a product, a sum, a difference, a quotient of the data value. Or any combination thereof based on the selected value. In other configurations, the integral or sum may be based on an absolute value of the forces. In yet other configurations, a function to be integrated or summed can be defined. For instance, the function can be an algebraic, trigonometric, exponential, or logarithmic, to name a few. For example, examples of other functions include evaluating a function based on a square of the measured force, an average of the measured force, or the square of the average of measured force, to name a few.

Different setups (lap welding, t-joints etc.) and welding parameters (rotation speed, travel speed) are expected to generally impact the magnitude of the recorded sensed force(s) and be accounted for in order to have an estimation process configured for a specific weld scenario. There are a number of possibilities for offset estimation, including estimating the absolute amount of the offset and estimating relatively whether one sensed position is offset by more or less than another and by how much. Because FSS is generally known to have significant process variation including variations arising from different configurations, welding speeds, tool design and so on, different techniques for offset estimation may be used for different FSW or FSP scenarios.

Lateral misalignment detection according to embodiments of the invention can be used for a variety of purpose in a variety of systems. In one embodiment, misalignment detection is used to verify that the FSW or FSP tool is properly laterally aligned relative to a selected lateral position or path referenced to the workpiece(s). This could be used to alert an operator in a conventional system or a robot in a robotic system when a misalignment exceeding a predetermined numerical threshold is detected. Such a misalignment could have serious effects on the weld quality.

Figure 4:
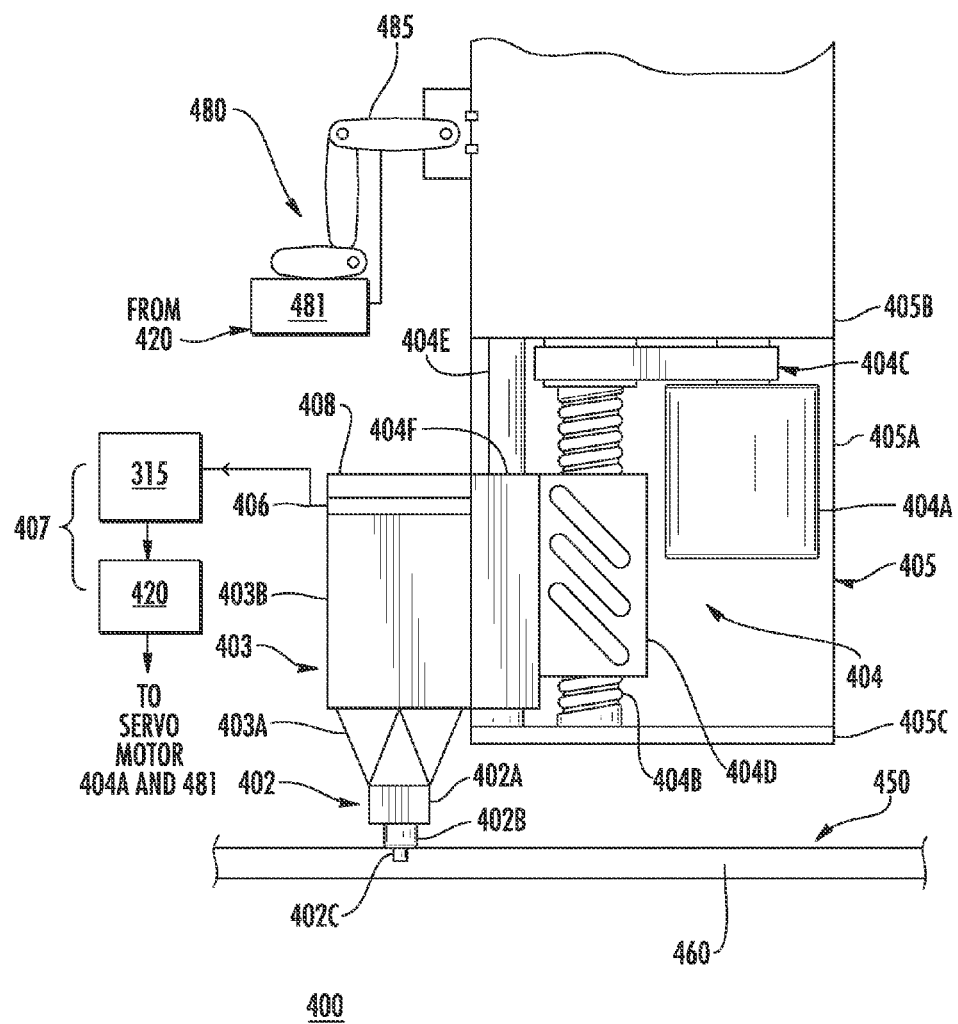
FIG. 4 shows an exemplary friction stir system having through the tool lateral position tracking according to an embodiment of the invention.

In another embodiment of the invention, misalignment detection according to the invention is used as part of a friction stir system having additional components implementing feedback control of the lateral position of the tool. Such systems are referred to herein as a "through the tool tracked FSS". In such a system, misalignment detection is used as a feedback signal for a closed-loop lateral position control system. FIG. 4 shows an exemplary friction stir system 400 having through the tool lateral position tracking according to an embodiment of the invention. Through the tool tracking provides automatic tracking to a desired lateral position (e.g. relative to a joint). Embodiments of the invention may be particularly helpful for successful joining of "blind T joints", and for robotic welding where tolerances in the robot and the fixturing holding the workpiece(s) provided are generally inadequate to ensure proper "tracking" of the joint during processing.

System 400 includes a rotary tool 402 for FSW, a rotational driving unit 403 for rotationally driving the rotary tool 402, a press driving unit 404 having the rotational driving unit 403 mounted thereon for pressing the rotary tool 402 against the surface of a welding portion 460 of a workpiece 450, and a mount bracket 405 for supporting the press driving unit 404. In addition, the friction stir welding system 400 further includes a force sensor 406 for detecting the force experienced by the rotary tool 402 while pressed on the workpiece 450 during operation of system 400.

A control unit 407 comprises a signal processing system 315 for estimating lateral offset and weld controller 420. Control unit 407 is provided for controlling the lateral position of rotary tool 402 so that measured force falls within a predetermined range based on a detection signal from the force sensor 406. The weld controller 420 uses the lateral offset data to control a lateral positioning mechanism to adjust the lateral position of rotary tool 402. For example, the lateral positioning mechanism can be a servo motor mechanism or an actuator mechanism. However, the various embodiments of the invention are not limited in this regard and any other type of device or mechanism can be used to provide the lateral positioning mechanism. In the exemplary configuration of FIG. 4, the lateral positioning mechanism is provided using a servo motor 481 which provides power to robotic arm 485 and optionally servo motor 404A. Thus, system 400 can be used to actively maintain sonic lateral position, such as at a seam/joint line in butt-welding. Alternatively, system 400 can also be used to provided weaving, oscillation, or any other variation in lateral position with respect to a propagation direction during processing. The tracking feature provided by system 400 can be particularly helpful when either the actual lateral position is difficult to obtain accurately through conventional visual means (e.g. for T-joints), or when the joint line is not a straight line, as can be case in robotic FSW systems, such as system 400 shown in FIG. 4.

The rotary tool 402 is generally made of steel or other material which is harder than the workpiece 450 and has a grip portion 402A adapted to be gripped by a chuck, a shank 402B provided on the grip portion 402A in such manner as to protrude from a distal end face thereof to thereby be pressed against the surface of the welding portion 460 of the workpiece 450, and a probe 402C provided a the shank 402B to protrude from a distal end face thereof to be inserted into the welding portion 460. The rotary tool 402 is caused to travel along the line of the welding portion 460 of the workpiece 450 while being rotationally driven at a speed of about 100 to 10,000 rpm so that the probe 402C softens the welding portion 460 by virtue of friction heat to thereby allow the portion being so softened to be plastically deformed in the vicinity of the traveling probe 402C. Welding portion 460 is welded when cooled and solidified.

The rotational driving unit 403 includes the tool chuck 403A for gripping the grip portion 402A of the rotary tool 402 and a spindle motor 403B having the tool chuck 403A fixed to a rotating shaft thereof for rotational driving. The spindle motor 403B is mounted on the press driving unit 404 at an upper end thereof which is opposite to the tool chuck 403A via a mounting plate 408. In this case, the spindle motor 403B is fixed to the mounting plate 408 at the upper end thereof with fasteners such as bolts and nuts while compressibly holding the force sensor 406 between the mounting plate 408 and itself. In the embodiment shown the sensor 406 is positioned between the tool and the vertical shaft. It is also generally possible for the force sensor to be in a number of other locations including below the material, elsewhere on the shaft, or even embedded in the tool.

The press driving unit 404 includes a servo motor 404A affixed to the mounting bracket 405 with a rotating shaft thereof being oriented upwardly, a ball screw shaft 404B rotatably supported on the mount bracket 405 at upper and lower ends thereof, a belt power transmission mechanism 404C for constituting a power transmission between an upper end portion of the ball screw shaft 404B and the rotating shaft of the servo motor 404A, a ball screw nut 404D adapted to thread fit on the ball screw shaft 404B in such a manner as to be movable vertically, a direct driven bearing rail 404E disposed in parallel with the ball screw shaft 404B and fixed to the mounting bracket 405 at upper and lower ends thereof and a direct driven bearing 404F adapted to fit on the direct driven bearing rail 404E in such a manner as to be movable vertically there along and integrally coupled to the ball screw nut 404D. Then, fixed to this direct driven bearing 404F is the mounting plate 408 to which the spindle motor 403B of the rotational driving unit 403 is fixed in turn.

The mounting bracket 405 has a side wall 405A to which the servo motor 404A is fixed, and an upper wall 405B and a lower wall 405C on which the ball screw shaft 404B and the direct driven bearing rail 404E are supported at the upper and lower ends thereof, respectively. The upper wall 405B is shown detachably attached (e.g. via bolts and nuts) to a robotic module 480 comprising robotic arm 485 and servo motor 481 for moving the robotic arm 485 and thus the rotational driving unit 403 and rotary tool 402 laterally or vertically.

The force sensor 406 outputs a detected force signal to the controller 420. The controller 420 is configured to provide a control signal to control the lateral position of rotary tool 402 relative to a joint or other location of the workpiece 450, such as via movement of arm 485 based on input signals from the force sensor 406 and a stored correlation relation between force and lateral position. Controller can also control servo motor 404A of the press driving unit 404, such as to change the rotation speed of rotary tool or the height of the rotary tool.

Controller 420 generally comprises a feedback control unit, a motor control signal output unit and a motor driving circuit. In addition, the controller generally includes memory such as Read Only Memory (ROM) for storing various types of data and programs, such as the force to lateral alignment correlation data or a function therefrom, a Random Access Memory (RAM) for temporarily storing various types of data and the like and a Central Processing Unit (CPU) for performing various types of operations as well as an input/output interface I/O between the force sensor 406 controller 420. An A/D converter (not shown) is generally included for converting the analog signal from the force sensor 406 into a digital signal. The feedback control unit can perform proportional, integral and differential (PID) operations relative to a deviation of the actual force relative to a target force to converge the deviation towards zero.

In one embodiment, through the tool tracking according to an embodiment of the invention enables automatic joint line tracking in FSW. Through the tool tracking also enables more complicated weld-seams to be obtained (e.g. a curved weld path). Further the robustness of the process can be improved by monitoring the lateral offset even in cases where the location of the weld-seam is known, such as by providing an assurance that proper alignment was maintained throughout the welding operation. Moreover, a feature of through the tool tracking is that it generally does not require added external sensors outside of force sensors on the tool, which are common in FSW and FSP. This can represent a significant savings in both cost and system complexity.

Other operational parameters can change the force sensed by force sensors according to the invention. However, it is generally possible to separate out changes in force due to other effects, such as due to a change in pin penetration depth which can change the measured axial force. In one embodiment of the invention, a two step process is repeated throughout the welding process. In the first step, the forces (including but not limited to axial force) are used to determine a particular lateral location relative to a joint, such as center of the weld which provides a maximum axial force. In this case, when the FSW tool is at the weld center, then a load-control function can be performed. The load control function can comprise changing some parameter (such as the vertical position which changes the pin penetration depth) to set the axial force to die desired load at the centered position. This sequence can be repeated throughout the weld.

Although the embodiments of the invention have generally been described relative to blind T-joint FSW where the system can detect offset both in direction from the seam and the magnitude of the lateral offset, embodiments of the invention are generally applicable to any type of weld joint or FSP, and are particularly helpful for automated robotic welding for FSW or FSP configurations.

Although not described herein, FSW or FSP according to the invention can be use to join different sample compositions. Moreover, active cooling can be performed during performing FSW to avoid melting the sample. For example, a backing plate (or anvil) which has coolant tubes running through it can be used for cooling.

FIG. 5 shows values of the axial forces (measured in Newtons) for FSW runs with varying amounts of offsets (measured in inches) obtained by the present Inventors. The welds run in this example were T-joint welds using aluminum workpieces. A string potentiometer transducer was attached to the lateral position to directly measure the lateral offset of the stage. The function can be seen to be in the shape of an inverted parabola. The maximum force is obtained very near the center of the seam, shown as a lateral offset of nearly zero. More generally, for FSW welds other than T-joints, the best position for the tool is generally not at the exact center, but instead is slightly offset toward the advancing side.

FIG. 6 shows the measured in-plane x-axis forces (measured in Newtons) for FSW runs with varying amounts of offsets (measured in inches) experienced by an FSW tool on the plane of the horizontal member (perpendicular to the axial force) obtained by the present Inventors. As with the data shown in FIG. 5, a string potentiometer transducer was attached to the lateral position to measure the lateral offset of the stage. The function obtained is in a shape characterized by near constant force levels at the offset location extremes, with a force of between about −200 and −300 N for lateral offsets between −0.16 to −0.07 inches and a force between −600 to −800 N for an offset of between 0.03 and 0.16 inches. A transition region between the location extremes has a force that generally decreases with increasing (more positive) lateral offset. A force of about −650 N corresponds to a lateral offset of nearly zero.

The data shown in FIGS. 5 and 6 demonstrates that lateral offset estimator can be configured by generating a generally non-linear function which maps at least one sensed force to a lateral offset. Such a function could be derived from a data set through regression, or be implemented through a support vector machine, neural network or other suitable method. In addition to regression methods, simulations, models and physical principles may also generally be used to derive predictive functions as well.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and/or the claims, such terms are intended to be inclusive in a manner similar to the term "comprising."

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

What is claimed is:

1. A friction stir method for processing at least one workpiece, wherein a system for said method comprises a spindle actuator coupled to a rotary tool comprising a rotating member for contacting and processing said at least one workpiece, the method comprising: oscillating the rotary tool laterally with respect to a selected propagation path for the rotating member with respect to the one workpiece to define an oscillation path for the rotating member;
    obtaining one or more force signals or parameters related to said force experienced by said rotary tool at least while the rotating member is disposed at first and second extremes of said oscillation of the rotary tool;
    comparing said force signals or parameters associated with the first extreme and said force signals or parameters associated with second extreme to stored lateral position correlation data to determine a lateral position of the selected propagation path with respect to a target path for the at least one workpiece; and
    determining a lateral offset value based on said lateral position and decreasing a lateral distance between the selected propagation path and the target path based on the lateral offset value.

2. The method of claim 1, wherein a vertical adjustment of the rotating member is performed when the oscillation path and the propagation path substantially overlap.

3. The method of claim 2, wherein the vertical adjustment is only performed periodically.

4. The method of claim 1, wherein said oscillating further comprises selecting a weaving pattern defining the oscillation path and specifying at least a dwell time and a lateral transition function for controlling the lateral oscillation.

5. A friction stir method for processing at least one workpiece, wherein a system for said method comprises a spindle actuator coupled to a rotary tool comprising a rotating member for contacting and processing said at least one workpiece, the method comprising:
    oscillating the rotary tool laterally with respect to a selected propagation path for the rotating member with respect to the one workpiece to define an oscillation path for the rotating member;
    obtaining one or more force signals or parameters related to said force experienced by said rotary tool at least while the rotating member is disposed at first and second extremes of said oscillation of the rotary tool;
    determining lateral offsets at said first and second extremes, respectively, using said force signals or parameters related to said force;
    comparing the degree of the lateral offsets at said first and second extremes; and
    reducing the lateral distance between the selected propagation path and a target path based on the comparing.

6. The method of claim 5, wherein a vertical adjustment of the rotating member is performed when the oscillation path and the propagation path substantially overlap.

7. The method of claim 6, wherein the vertical adjustment is only performed periodically.

8. The method of claim 5, wherein said oscillating further comprises selecting a weaving pattern having for defining the oscillation path and specifying at least a dwell time and a lateral transition function for controlling the lateral oscillation.

9. The method of claim 5, further comprising:
    repeating said oscillating, obtaining, computing, determining, and adjusting to minimize a difference between the selected propagation path and the target path.

10. A friction stir method for processing at least one workpiece, wherein a system for said method comprises a spindle actuator coupled to a rotary tool comprising a rotating member for contacting and processing said at least one workpiece, the method comprising:
    weaving the rotary tool to cause the rotating member to move laterally with respect to a selected propagation path during processing of the at least one workpiece;
    measuring a plurality of axial force signals or parameters related to said force experienced by said rotary tool at least while the rotating member is laterally moving away from the selected propagation path; and
    reversing a direction of the lateral motion once an aggregate of the measured force signals or parameters meets a reversal criteria.

11. The method of claim 10, further comprising repeating the steps of measuring and reversing.

12. The method of claim 10, wherein a vertical adjustment of the rotating member is performed when the oscillation path and the propagation path substantially coincide.

13. The method of claim 12, wherein the lateral motion of the rotating member is temporarily suspended when the oscillation path and the propagation path substantially coincide.

14. The method of claim 10, wherein the step of reversing further comprises computing said aggregate using a summation function based on the sampled force signals or parameters.

15. The method of claim 10, wherein the step of reversing further comprises computing said aggregate using an integral of a function defined by the sampled force signals or parameters.

16. The method of claim 10, wherein the aggregate is based on at least one of a normalization of the plurality force signals or parameters.

17. The method of claim 5, wherein the lateral offset information comprises at least a direction.

* * * * *